(12) United States Patent
Ahn et al.

(10) Patent No.: US 7,660,059 B2
(45) Date of Patent: Feb. 9, 2010

(54) METHOD OF CONTROLLING WRITE STRENGTH OF HDD AND RECORDING MEDIUM HAVING RECORDED THEREON PROGRAM SUITABLE FOR SAME

(75) Inventors: Hyo-june Ahn, Suwon-si (KR); Hae-jung Lee, Suwon-si (KR); Seon-mi Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 276 days.

(21) Appl. No.: 11/430,030

(22) Filed: May 9, 2006

(65) Prior Publication Data

US 2007/0002486 A1 Jan. 4, 2007

(30) Foreign Application Priority Data

May 9, 2005 (KR) .................... 10-2005-0038382

(51) Int. Cl.
*G11B 27/36* (2006.01)
(52) U.S. Cl. .................. 360/31; 360/60; 360/68
(58) Field of Classification Search ........................ None
See application file for complete search history.

(56) References Cited

U.S. PATENT DOCUMENTS

| | | | |
|---|---|---|---|
| 5,121,262 A | 6/1992 | Squires et al. | |
| 5,168,413 A | 12/1992 | Coker et al. | |
| 5,377,058 A | 12/1994 | Good et al. | |
| 5,410,439 A | 4/1995 | Egbert et al. | |
| 5,426,537 A * | 6/1995 | Yeh et al. | 360/46 |
| 5,588,007 A | 12/1996 | Ma | |
| 5,995,305 A | 11/1999 | McNeil et al. | |
| 6,094,318 A | 7/2000 | Kim | |
| 6,141,162 A * | 10/2000 | Kotani | 360/46 |
| 6,175,456 B1 | 1/2001 | Yun | |
| 6,452,735 B1 * | 9/2002 | Egan et al. | 360/31 |
| 6,618,215 B2 * | 9/2003 | Fung et al. | 360/31 |
| 6,700,718 B2 * | 3/2004 | Wilson | 360/31 |
| 6,757,124 B2 * | 6/2004 | Kelemen | 360/75 |
| 6,987,628 B1 * | 1/2006 | Moline et al. | 360/31 |

(Continued)

FOREIGN PATENT DOCUMENTS

JP   07-153129   6/1995

(Continued)

OTHER PUBLICATIONS

European Search Report issued Jul. 20, 2007 in corresponding European Patent Application No. 06009379.6-1232.

*Primary Examiner*—Jason C Olson
(74) *Attorney, Agent, or Firm*—Staas & Halsey LLP (57) ABSTRACT

Provided are a method of improving a recording performance of a hard disk drive (HDD) by controlling write strength according to a flying height of a head and a computer-readable recording medium having recorded thereon a computer-readable program suitable for the method. The method of controlling write strength of the HDD includes calculating the flying height of the head before starting a recording operation and controlling the write strength according to the calculated flying height. Accordingly, optimal writing can be performed by the write strength according to the head flying height.

28 Claims, 10 Drawing Sheets

U.S. PATENT DOCUMENTS

| | | | |
|---|---|---|---|
| 7,023,647 B2 * | 4/2006 | Bloodworth et al. | 360/75 |
| 7,079,337 B2 * | 7/2006 | Tokizono et al. | 360/31 |
| 7,161,754 B2 * | 1/2007 | Hanazawa et al. | 360/51 |
| 7,212,361 B1 * | 5/2007 | Pederson et al. | 360/31 |
| 7,310,194 B1 * | 12/2007 | Schardt et al. | 360/75 |
| 7,430,083 B2 * | 9/2008 | Loh et al. | 360/31 |
| 2002/0114092 A1 | 8/2002 | Yang | |
| 2004/0264030 A1 | 12/2004 | Yang | |
| 2005/0013036 A1 | 1/2005 | Yang | |
| 2006/0126206 A1 * | 6/2006 | Takagi et al. | 360/46 |
| 2006/0209445 A1 * | 9/2006 | Yamasaki et al. | 360/46 |

FOREIGN PATENT DOCUMENTS

| | | |
|---|---|---|
| JP | 07-311991 | 11/1995 |
| JP | 2003-007017 | 1/2003 |
| JP | 2004-111042 | 4/2004 |
| JP | 2006172593 A * | 6/2006 |
| KR | 1020010078765 | 8/2001 |
| WO | WO 91/06094 | 5/1991 |

* cited by examiner

METHOD OF CONTROLLING WRITE STRENGTH OF HDD AND RECORDING MEDIUM HAVING RECORDED THEREON PROGRAM SUITABLE FOR SAME

CROSS-REFERENCE TO RELATED APPLICATIONS

This application claims the benefit of Korean Patent Application No. 10-2005-038382, filed on May 9, 2005, in the Korean Intellectual Property Office, the disclosure of which is incorporated herein in its entirety by reference.

BACKGROUND OF THE INVENTION

1. Field of the Invention

The present invention relates to a hard disk drive (HDD), and more particularly, to a method of improving a recording performance thereof by controlling write strength according to a flying height of a head and a computer-readable recording medium having recorded thereon a computer-readable program suitable for the method.

2. Description of the Related Art

A hard disk drive (HDD), which is a type of data storage medium, reproduces data recorded on a disk or writes data on the disk using a magnetic head.

Figure 1:
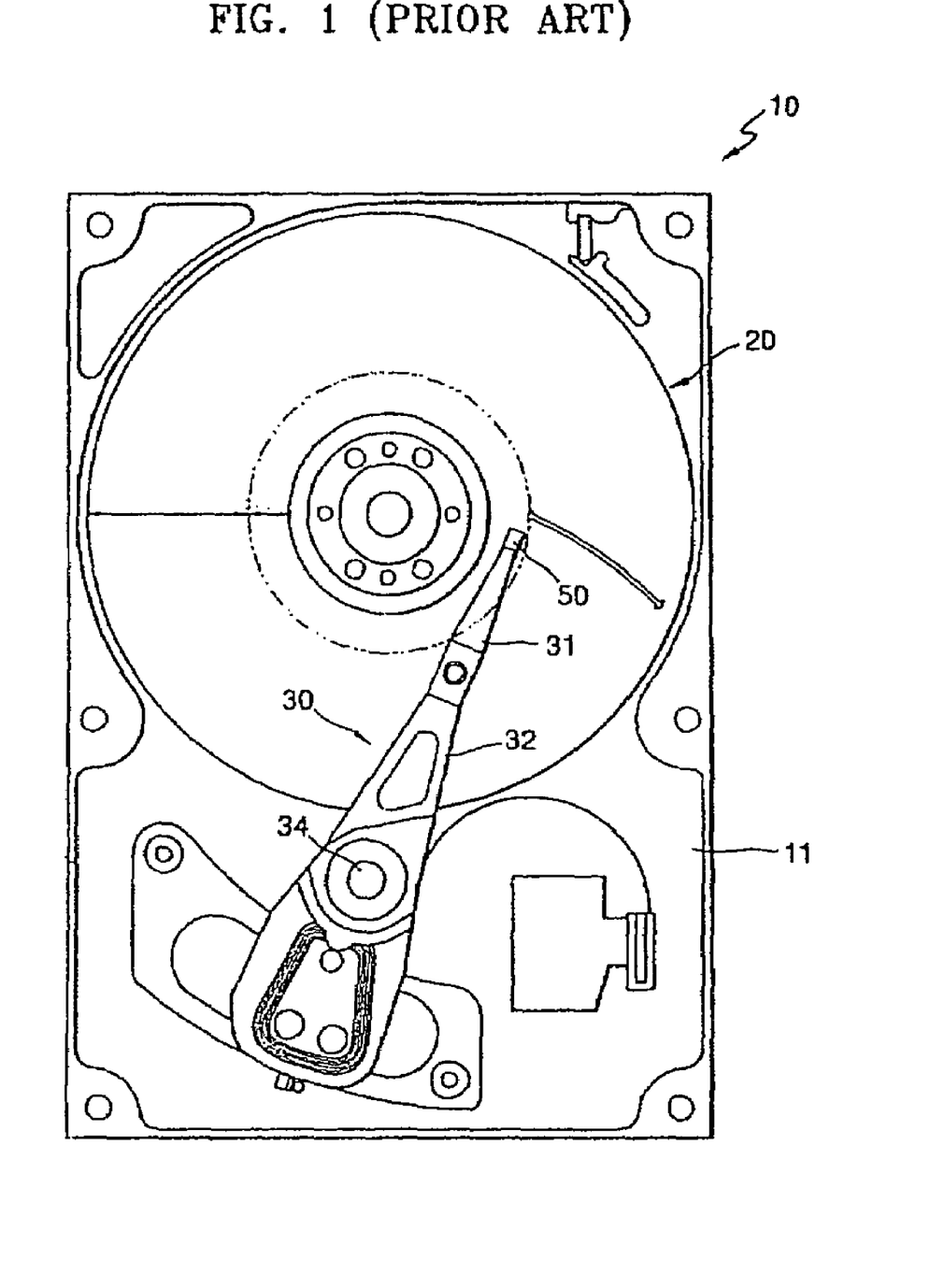
FIG. 1 is a structure of a typical hard disk drive (HDD)

FIG. 1 is a structure of a typical HDD 10. Referring to FIG. 1, a hard disk 20 is assembled in the HDD 10 to rotate on a base 11 of the HDD 10. The HDD 10 includes at least one magnetic head positioned over a recording/reproducing surface of the rotating hard disk 20 to read or write information by sensing or magnetizing a magnetic field formed on the hard disk 20.

The magnetic head is combined with one end of a magnetic head assembly 30 assembled to rotationally move on the base 11 of the HDD 10. The head is moved to a target position on the rotating hard disk 20 according to stewing of the magnetic head assembly 30.

The magnetic head assembly 30 includes a magnetic head slider 50 having the magnetic head attached that can write or read information on or from the hard disk 20 at one end thereof, an actuator arm 32 connected to a rotary axis 34 to allow rotation, and a suspension 31 connected between the actuator arm 32 and the magnetic head slider 50.

The magnetic head slider 50 is biased to the hard disk 20 by the suspension 31, and when the hard disk 20 starts to rotate, the magnetic head slider 50 flies and floats on a cushion of air over the hard disk 20 as a result of air flow pressure generated by the rotation of the hard disk 20. When the magnetic head slider 50 flies and floats, a gap between the magnetic head and the surface of the hard disk 20 that results is the flying height.

Figure 2:
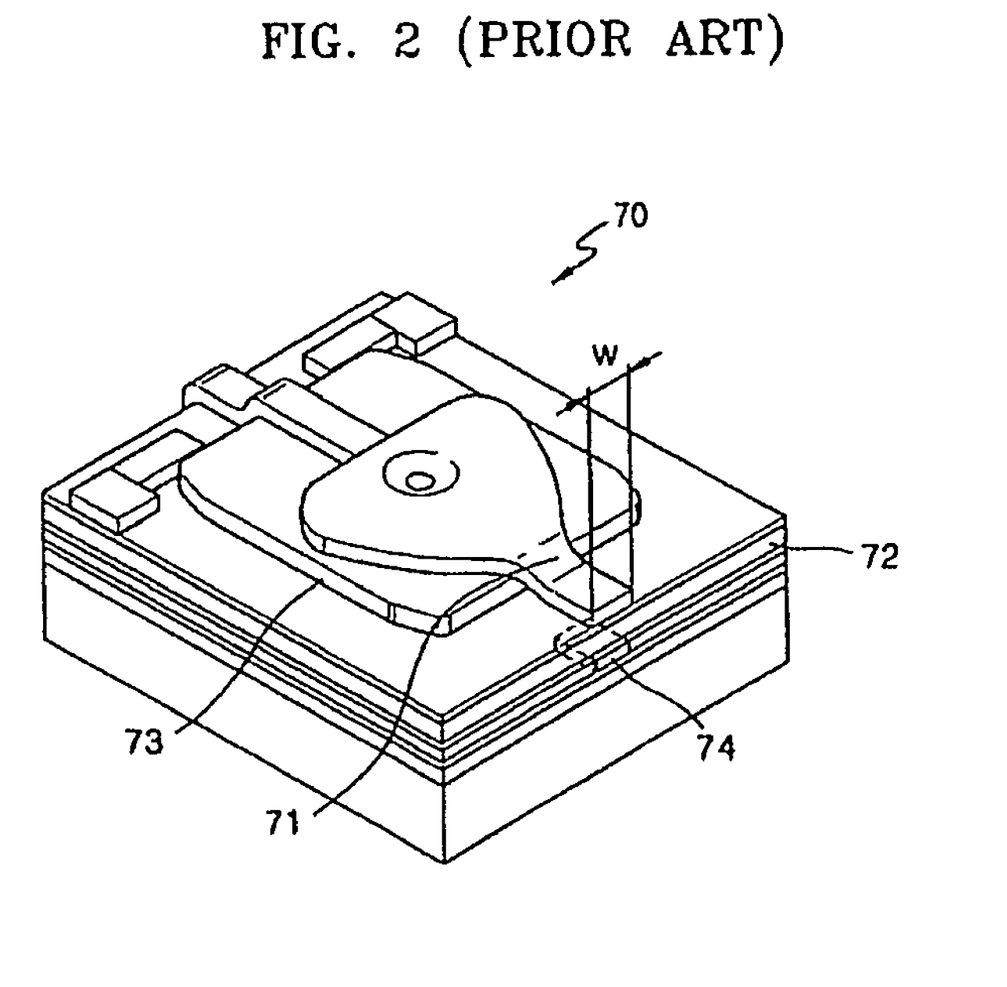
FIG. 2 is a perspective view of a typical magnetic head.

FIG. 2 is a perspective view of a typical magnetic head 70. Referring to FIG. 2, the magnetic head 70 includes a magneto-resistive head 74 for reproducing and an inductive write head for recording. The magneto-resistive head 74 senses and reads a magnetic signal recorded on the hard disk 20. The inductive write head writes a desired signal on the hard disk 20. The inductive write head includes a top pole 71 and a bottom pole 72, which are separated from each other by a predetermined gap to form a leakage flux for magnetizing a magnetic layer of the hard disk 20, and a write coil 73, which generates a magnetic field by applying a current thereto.

Recently, in HDDs, TPI (track per inch) has been increased to increase storage capacity, flying height has been reduced, and write frequency has increased.

To reduce a track width of the hard disk 20, a width of the inductive write head for writing a magnetic signal on the track should be reduced according to the reduction of the track width. To read a magnetic signal written on the narrowed track, the flying height of the magnetic head 70 should be lowered.

It is preferable that the flying height of the magnetic head 70 be as low as possible within an acceptable limitation. The flying height of the magnetic head 70 is optimized by considering the number of rotations of a spindle motor, a disk substance, and mechanical characteristics of the head assembly.

However, the flying height of the magnetic head 70 may vary due to an operational temperature of the HDD 10, atmospheric pressure, moisture content in the air, or a driving voltage of the HDD 10. For example, the atmospheric pressure in the HDD 10, which varies according to a user environment, influences air flow pressure required to float the magnetic head 70.

Thus, it is necessary to consider these variables, in order to optimize the flying height of the magnetic head 70.

The lower the flying height of the magnetic head 70, the less a margin of a head-disk interface (HDI). In particular, if the flying height is too high, a weak write may occur, and if the flying height is too low, the magnetic head 70 may crash onto the hard disk 20.

Methods of measuring a flying height of a head are disclosed in Japanese Patent Publication No. 2003-7017, Korean Patent Publication No. 2001-78765, U.S. Pat. No. 5,377,058, etc.

Figure 3A:
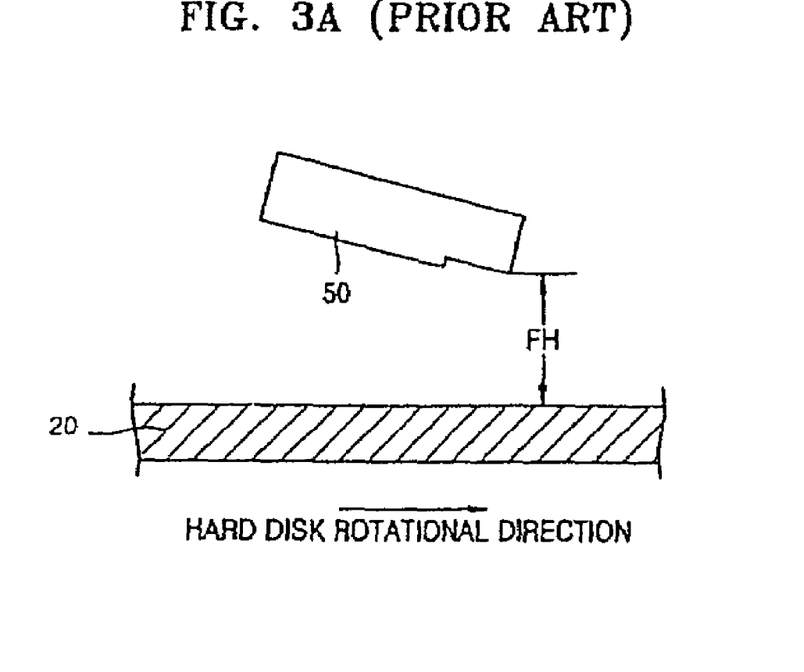
FIGS. 3A and 3B are illustrations for explaining thermal pole tip protrusion (TPTP)
Figure 3B:
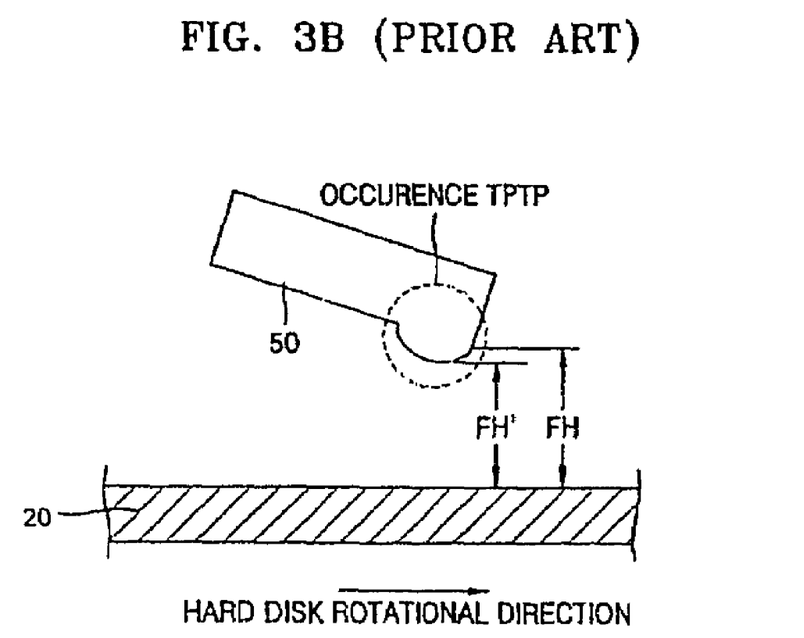

FIGS. 3A and 3B are illustrations for explaining thermal pole tip protrusion (TPTP). FIG. 3A illustrates a state when a reproducing operation is performed, and FIG. 3B illustrates a state when a recording operation is performed. The flying height (FH) is shown as the distance between the hard disk 20 and the head attached to the head slider 50. Referring to FIG. 3B, it is known that the top and bottom write poles 71 and 72 protrude (FH>FH') when a recording operation is performed compared to when a reproducing operation is performed as illustrated in FIG. 3A. The protrusion of the write poles 71 and 72 occurs due to a heat expansion coefficient difference between the nonmetallic head slider 50 and the metallic head 70. The protrusion causes a reduction in the area between the hard disk 20 and the head, resulting in a new flying height (FH'). The amount of TPTP is proportional to $I^2R$, wherein I denotes a write current and R denotes resistance of the write coil 73. In other words, the TPTP is an inevitable phenomenon occurring due to a current flowing through the write coil 73.

The TPTP influences the HDI. If the write poles 71 and 72 protrude due to the TPTP, the gap between the magnetic head 70 and the hard disk 20 is reduced (FH>FH'). Accordingly, the margin of the HDI is reduced.

Figure 4:
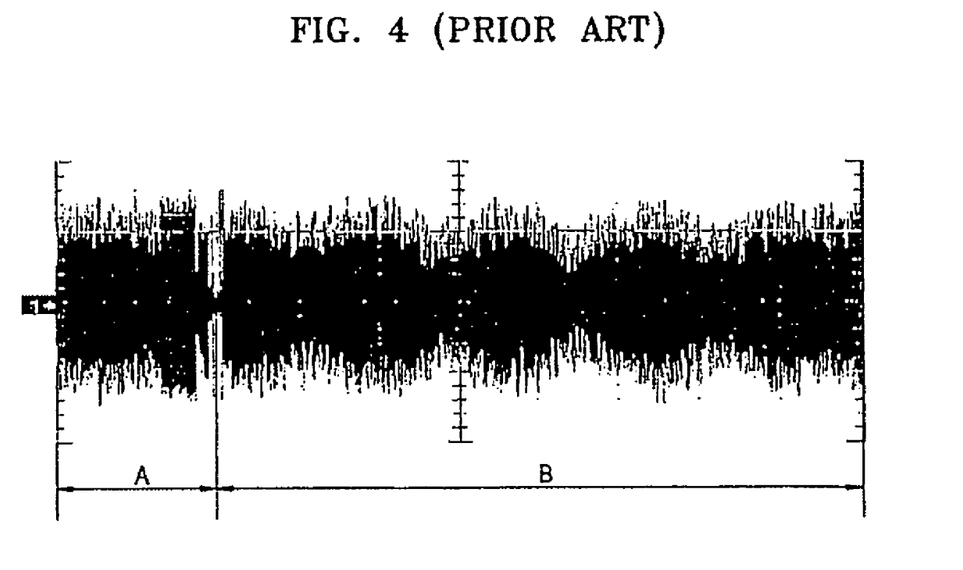
FIG. 4 is a waveform diagram for explaining an effect of a crash between a head and a disk when a recording operation is performed.

FIG. 4 is a waveform diagram for explaining an effect of a crash between a head and a disk when a recording operation is performed. In FIG. 4, an A section on the left represents a time period during which the head does not crash onto the disk, and a B section on the right represents a time period during which the head periodically crashes onto the disk. It can be seen that a waveform of a reproducing signal has a periodic fluctuation in the B section. The periodic fluctuation is a result of the periodical crash between the head and the disk when the recording operation is performed in the B section. This phenomenon is called a modulation phenomenon, and it is observed that the higher the altitude, the more severe the modulation phenomenon. This is because the higher the altitude, the lower the atmospheric pressure, resulting in a lower flying height of the head, and thereby causing a worse effect due to the TPTP. Thus, it is preferable that write strength influencing the TPTP is controlled according to the flying height of the head.

SUMMARY OF THE INVENTION

The present invention provides a method of controlling write strength of a hard disk drive (HDD) according to a flying height of a head.

The present invention also provides a computer-readable medium having recorded thereon a computer-readable recording program for performing the method.

According to one aspect, the present invention provides a method of controlling write strength of the HDD, the method including calculating a flying height of a head before starting a recording operation and controlling the write strength according to the calculated flying height.

The write strength may be controlled by at least one of the following: a write current (WC), an overshoot current (OSC), or an overshoot duration (OSD).

In an embodiment of the present invention, the calculation of the flying height of the head may include setting a reference value AGC0 of a reproducing signal by measuring the magnitude of the reproducing signal read from a measuring area of a disk while rotating the disk at a regular rotation speed using constantly-maintained operational conditions of the HDD and measuring a reference flying height corresponding to the reference value AGC0 of the reproducing signal, measuring the magnitude of the reproducing signal read from the measuring area of the disk while rotating the disk at the regular rotation speed, and calculating the flying height of the head in a user environment by referring to the measured magnitude of the reproducing signal, the reference value AGC0 of the reproducing signal, and the reference flying height corresponding to the reference value AGC0 of the reproducing signal.

The measuring of the reference value AGC0 and the reference flying height corresponding to the reference value AGC0 may be performed using a burn-in test process.

The measuring area may be a servo area in which a servo signal is recorded on the disk or a data area having recorded thereon a constant pattern of data.

The measuring area may be protected so as not to be rewritten.

The reference value AGC0 and the measured magnitude of the reproducing signal may be average values of a plurality of samples obtained from the measuring area.

According to another aspect, an embodiment of the present invention provides a recording medium having recorded thereon a computer-readable program for performing a method including calculating a flying height of a head in a user environment before starting a recording operation and controlling the write strength according to the calculated flying height.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 5:
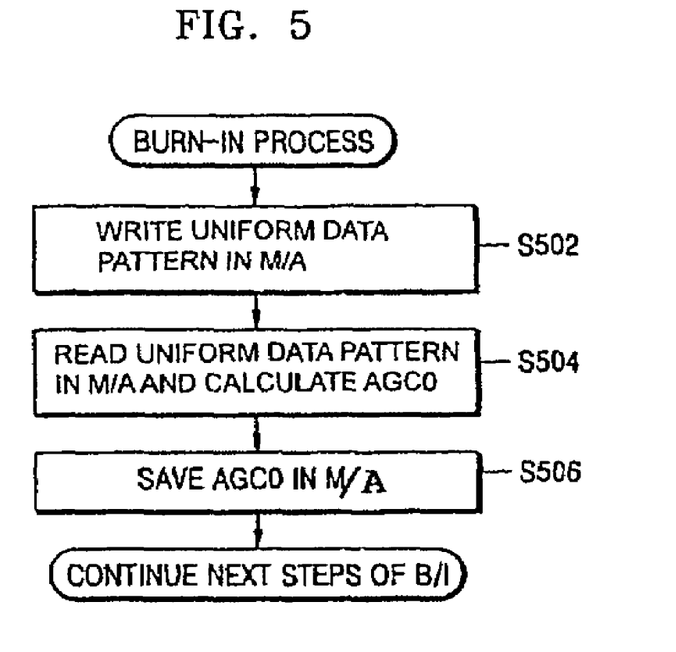
FIGS. 5 and 6 are flowcharts illustrating a method of measuring a flying height of a head according to an embodiment of the present invention.
Figure 6:
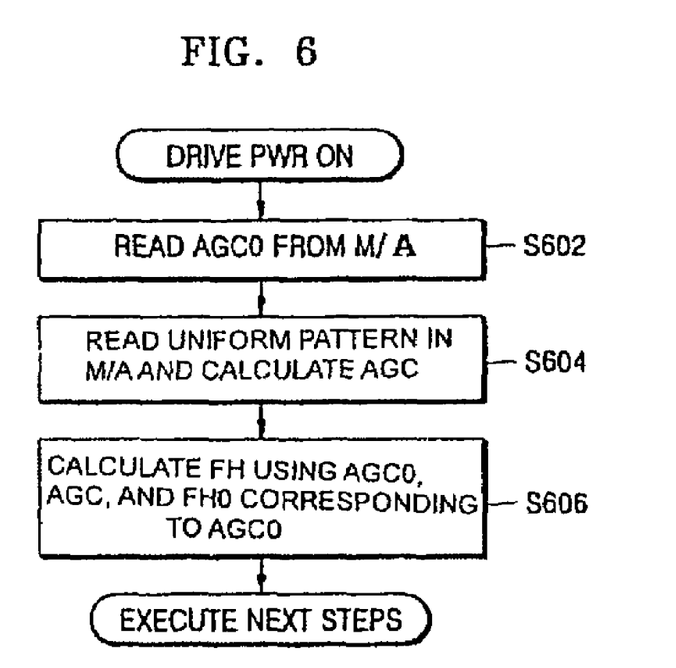

FIGS. 5 and 6 are flowcharts illustrating a method of measuring a flying height of a head of a hard disk drive (HDD) according to an embodiment of the present invention. FIG. 5 is a flowchart illustrating a process of setting a reference value AGC0 of a reproducing signal for measuring a head flying height in a burn-in process of the HDD using constantly-maintained operational conditions of the HDD and measuring a reference head flying height corresponding to the reference value AGC0. FIG. 6 is a flowchart illustrating a process of measuring a head flying height in a user environment. FIGS. 5 and 6 are flowcharts of processes using a data area of a maintenance area as a measuring area.

Referring to FIG. 5, in operation S502, data having a uniform pattern is written in a portion of the maintenance area of a disk during the burn-in test process. The maintenance area is an area accessed only by an HDD, not by a user, and an area in which information that should be maintained for operations of the HDD is written. In the embodiment illustrated in FIG. 5, a portion of the maintenance area is used as the measuring area since the measuring area is an area in which data should not be rewritten.

However, the measuring area is not limited to the maintenance area. It is only limited to the maintenance area if rewriting is not allowed in the area that is used to measure the head flying height.

According to the embodiment of FIG. 5, an example of writing data having a uniform pattern in the data area is illustrated. However, the data writing is not limited to the data area. In the HDD, tracks include alternatively-arranged servo areas and data areas. In the current embodiment, a servo area is an area in which servo information is written. The servo information includes information having a uniform pattern all over the disk area, such as a servo sync signal. Thus, in embodiments of the present invention, the servo area can be used as the measuring area.

In operation S504, the data written in operation S502 is read, and the reference value AGC0 is set by calculating an average value of a gain of an automatic gain control circuit. In the HDD, the magnitude of the reproducing signal can be represented by the gain of the automatic gain control circuit. The automatic gain control circuit outputs a reproducing signal having a constant magnitude by controlling an amplification gain according to the magnitude of the reproducing signal read by the head. That is, the gain of the automatic gain control circuit is inversely proportional to the magnitude of the reproducing signal read by the head.

The average value of the gain of the automatic gain control circuit obtained by reading the data written in the measuring area is the reference value AGC0, which is used to calculate the head flying height. The burn-in test process is performed in a chamber in which constant atmospheric pressure and temperature is maintained. Thus, the head flying height in the burn-in test process is constant, and thus the reference value AGC0 can be used in calculating the head flying height.

That is, the head flying height in the user environment can be represented by comparing the gain of the automatic gain control circuit with the reference value AGC0.

In operation S506, the average value of the gain of the automatic gain control circuit is written in the maintenance area as the reference value AGC0. The reference value AGC0 is a standard used to determine the head flying height in the user environment.

Referring to FIG. 6, a method of measuring the head flying height in the user environment using the reference value AGC0 obtained through the method illustrated in FIG. 5 is shown.

When power is applied to the HDD, in operation S602, the reference value AGC0 that is used in determining the head flying height is read from the maintenance area. The reference value AGC0 is the average value of the gain of the automatic gain control circuit obtained by reading the data having the uniform pattern written in the measuring area as illustrated in FIG. 5.

In operation S604, an average value AGC of the gain of the automatic gain control circuit is obtained by reading the data written in the measuring area while in the user environment.

In operation S606, the head flying height FH in the user environment is calculated using the reference value AGC0, the reference head flying height FH0 corresponding to the reference value AGC0, and the average value AGC of the gain of the automatic gain control circuit in the user environment.

If data written in the measuring area was written by uniform write strength and a uniform write frequency, it can be considered that the gain of the automatic gain control circuit obtained by reading the data written in the measuring area in the user environment is related only to the head flying height. Moreover, the more data samples considered, the more accurate the calculation of the head flying height will be. According to experiments, it has been observed that an accuracy value for the flying height of over 95% can be guaranteed when 1000 data samples are used.

Figure 7:
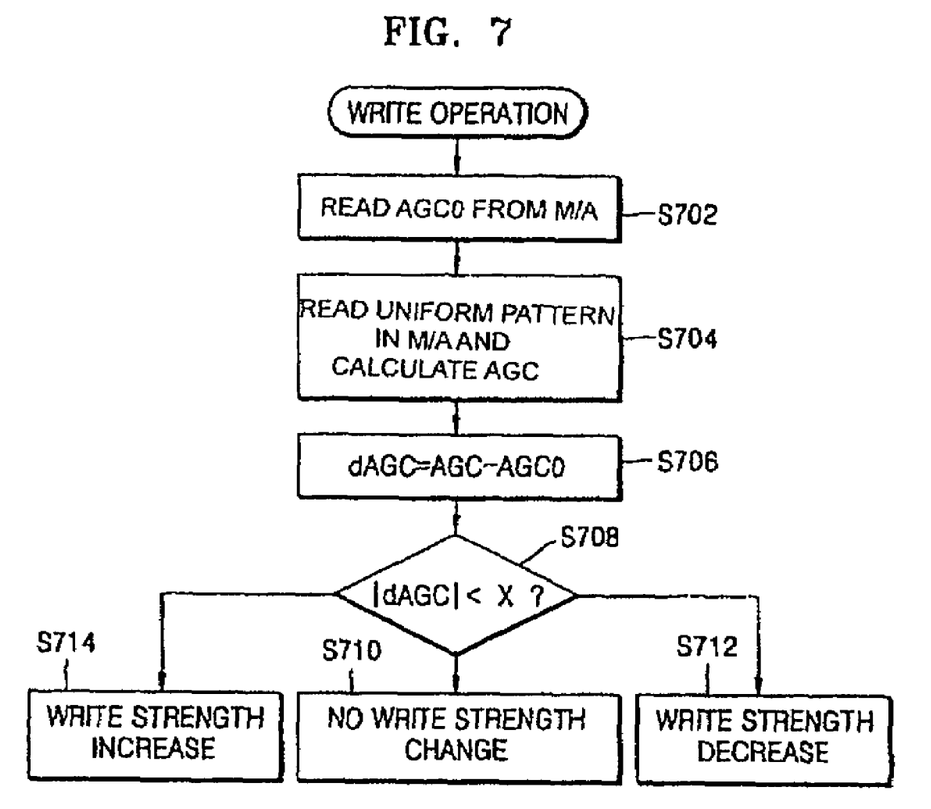
FIG. 7 is a flowchart illustrating a method of controlling a write strength of an HDD according to an embodiment of the present invention.

FIG. 7 is a flowchart illustrating the method of controlling the write strength according to an embodiment of the present invention.

In the method of controlling the write strength according to an embodiment of the present invention, the write strength is controlled according to the head flying height. That is, the head flying height is measured in the user environment before a recording operation starts, and the write strength is controlled according to the difference between the measured flying height and the reference flying height. The write strength is controlled by controlling values of a write current WC, an overshoot current OSC, or an overshoot duration OSD.

The head flying height is measured before the recording operation starts. The head flying height in the user environment can vary according to the operational temperature of the HDD, atmospheric pressure, moisture content in the air, or the driving voltage of the HDD. To measure the head flying height, a head flying height measurement method according to the embodiment of the present invention, such as the one illustrated in FIGS. 5 and 6, can be used.

In operation S702, the reference value AGC0 is written in the maintenance area using the process illustrated in FIG. 5.

In operation S704, the average value AGC of the gain of the automatic gain control circuit is obtained by reading the data written in the measuring area when the HDD is in the user environment. In operation S706, a difference dAGC between the measured value AGC and the reference value AGC0 is calculated.

In operation S708, it is determined whether the difference dAGC is within a predetermined detection limitation X and whether the difference dAGC has a positive or negative value.

If the difference dAGC is within the predetermined detection limitation X in operation S708, the write strength is not controlled in operation S710.

If the difference dAGC is not within the predetermined detection limitation X, and if the difference dAGC has a positive value, the write strength is increased in operation S714.

The gain of the automatic gain control circuit is inversely proportional to the magnitude of the reproducing signal read by the head. A positive value of the difference dAGC means that AGC measured in the user environment is greater than AGC0 measured in the burn-in test environment. This means that the magnitude of the reproducing signal in the user environment is less than the magnitude of the reproducing signal in the burn-in test environment and that the head flying height in the user environment is greater than the head flying height in the burn-in test environment. Thus, the write strength should be increased above the optimized write strength in the burn-in test environment.

If the difference dAGC is not within the predetermined detection limitation X, and if the difference dAGC has a negative value, the write strength is decreased in operation S712.

For the write strength, the reference value AGC0 is set in the burn-in test process. The write strength is optimized according to the operating environment of the HDD in the user environment, and more particularly, according to the head flying height.

Figure 8:
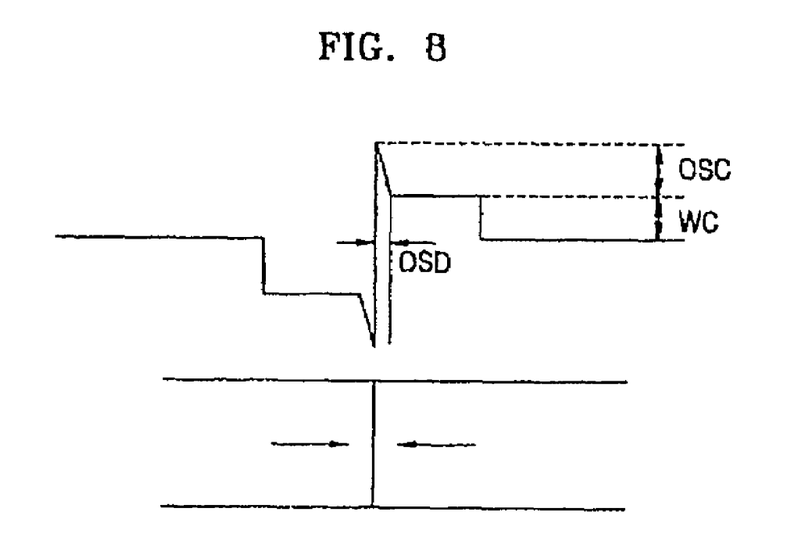
FIG. 8 is a waveform diagram of a current applied to a write coil in a recording operation according to an embodiment of the present invention.

FIG. 8 is a waveform diagram of a current applied to a write coil in a recording operation according to an embodiment of the present invention. In FIG. 8, besides a write current (WC) for generating a write magnetic field, an overshoot component is included when a data value is changed. A current for providing the overshoot component is called an overshoot current (OSC), and a duration for which the OSC is maintained is called an overshoot duration (OSD).

The WC makes the strength of a magnetic field keep more or less a coercive force, and the OSC increases the strength of the magnetic field to be greater than the coercive force at a position where a direction of the magnetic field is changed. Thus, in the recording operation, the WC, the OSC, and the OSD influence the magnitude of TPTP.

Figure 9A:
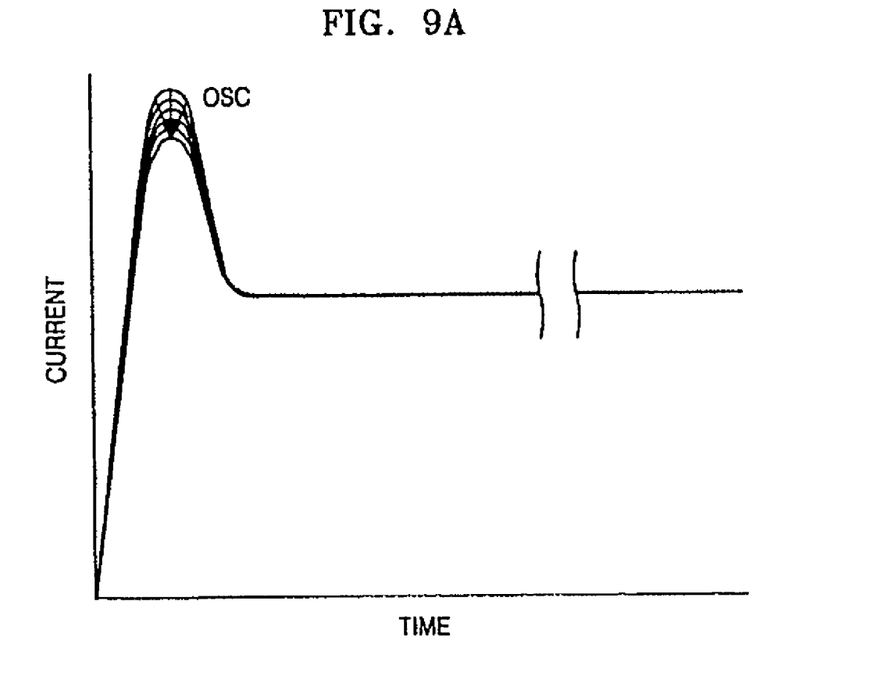
FIGS. 9A through 9C are graphs of varying write strengths according to embodiments of the present invention.
Figure 9B:
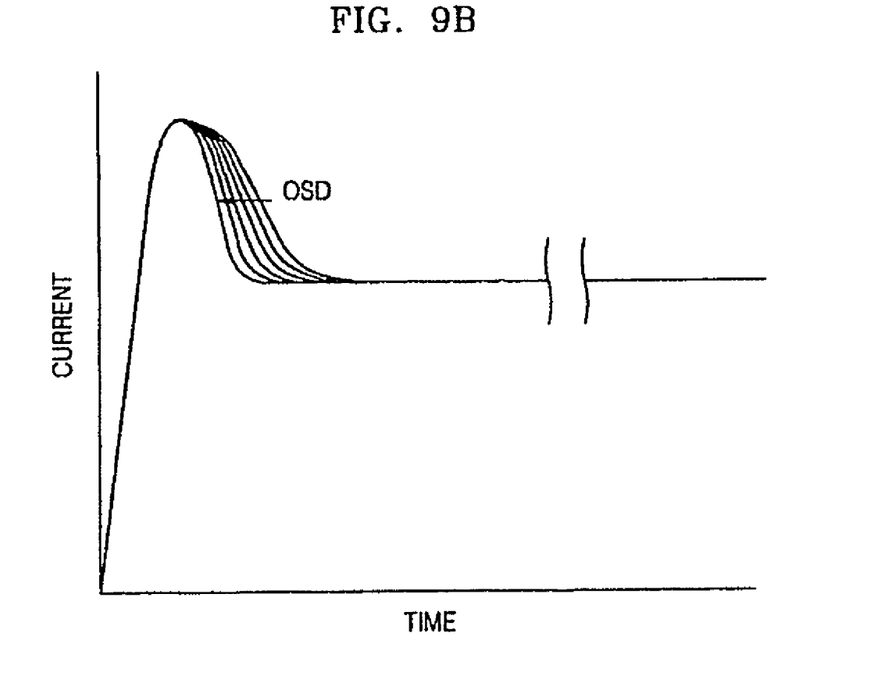
Figure 9C:
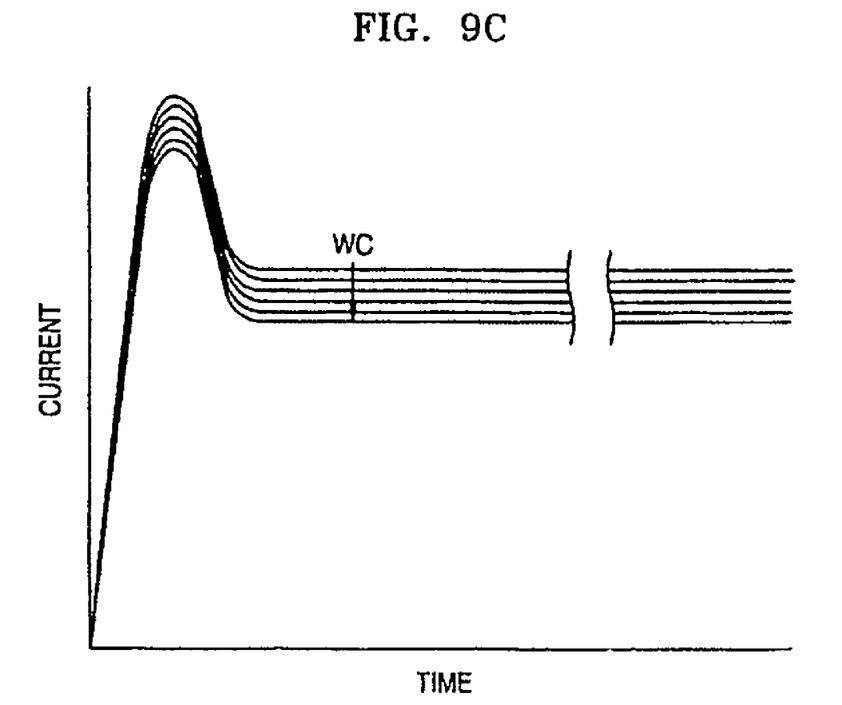

FIGS. 9A through 9C are diagrams of illustrations in which the write strength is changed, according to embodiments of the present invention. FIG. 9A illustrates an example of changing OSC, FIG. 9B illustrates an example of changing OSD, and FIG. 9C illustrates an example of changing WC.

Figure 10:
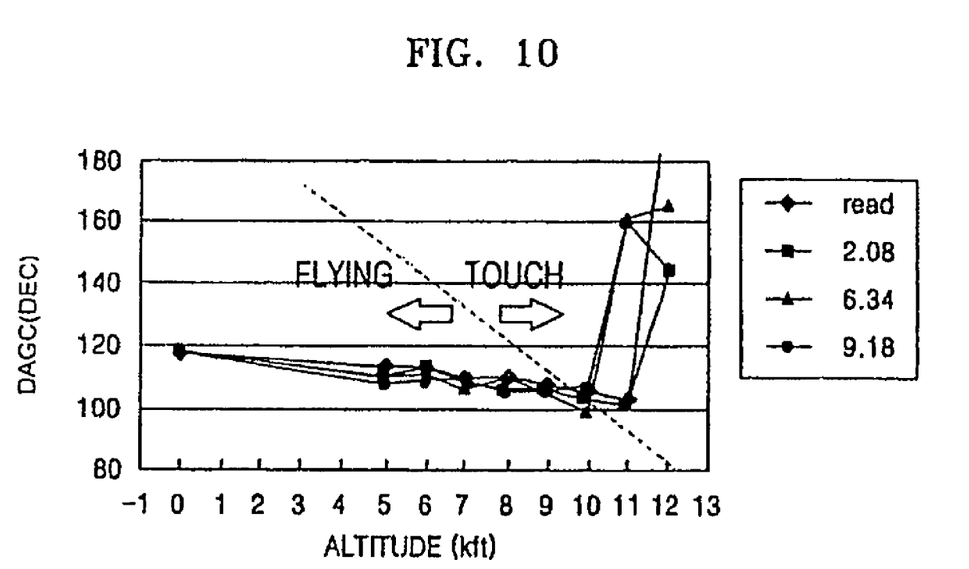
FIG. 10 is a diagram illustrating correlations of a gain DAGC of an automatic gain control circuit in a data area according to atmospheric pressure and write strength according to an embodiment of the present invention.

FIG. 10 is a diagram illustrating correlations of a gain DAGC (data AGC) of the automatic gain control circuit in a data area according to altitude and write strength in an embodiment of the present invention. Here, the write strength depends upon OSD.

In FIG. 10, the vertical axis indicates DAGC, and the horizontal axis indicates the altitude. An increase of the gain of the automatic gain control circuit is proportional to a decrease of the magnitude of a reproducing signal.

Referring to a graph of the reproducing signal of FIG. 10, an increase of the altitude causes a gradual decrease of the DAGC, and the DAGC rapidly increases at an altitude of 11 ktf. The rapid increase of the magnitude of the DAGC at an altitude of 11 ktf occurs since the head crashes onto the disk. Referring to FIG. 10, an increase of the altitude makes a decrease of the head flying height, and if the altitude is greater than a predetermined limitation value, the head crashes onto the disk.

Referring to graphs of write strengths of 2.08 and 9.18 of FIG. 10, for the write strength of 2.08, the head crashes onto the disk when the altitude is 11 ktf, and for the write strength of 9.18, the head crashes onto the disk when the altitude is 10 ktf. This indicates that the write strength should be controlled in relation to the altitude.

Figure 11:
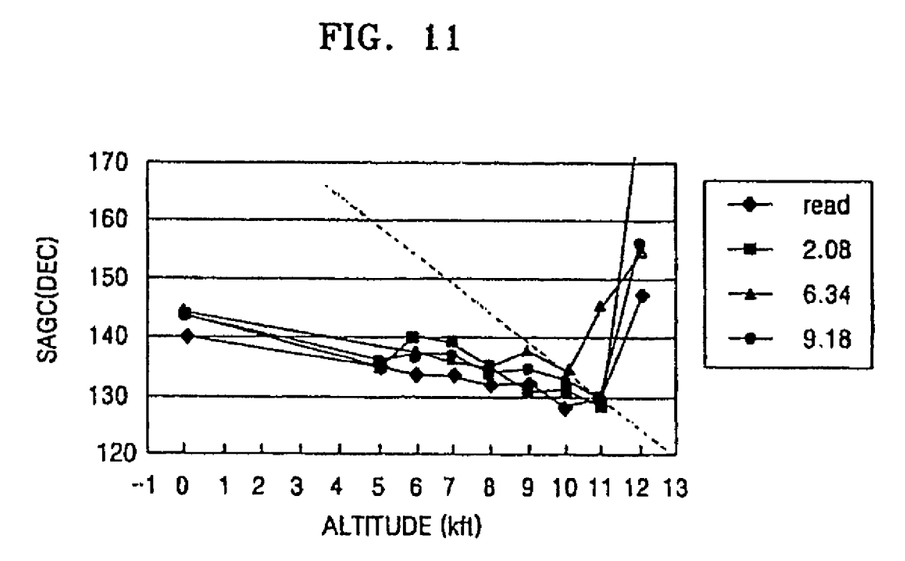
FIG. 11 is a diagram illustrating correlations of a gain SAGC of the automatic gain control circuit in a servo area according to atmospheric pressure and write strength according to an embodiment of the present invention.

FIG. 11 is a diagram illustrating correlations of a gain SAGC (servo AGC) of the automatic gain control circuit in a servo area according to altitude and write strength in an embodiment of the present invention. In FIG. 11, the vertical axis indicates SAGC, and the horizontal axis indicates the altitude. Referring to FIG. 11, the head can be prevented from crashing onto the disk by controlling the write strength in relation to the altitude.

Figure 12:
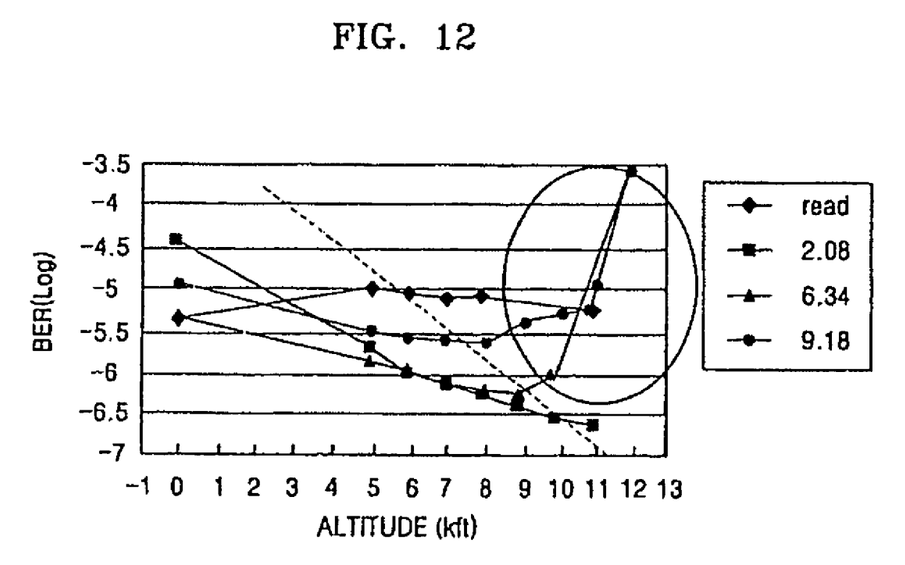
FIG. 12 is a diagram illustrating correlations of a bit error rate (BER) of a reproducing signal in the data area according to atmospheric pressure and write strength according to an embodiment of the present invention.

FIG. 12 is a diagram illustrating correlations of a bit error rate (BER) of a reproducing signal in the data area according to atmospheric pressure and write strength in an embodiment of the present invention. In FIG. 12, the vertical axis indicates the BER, and the horizontal axis indicates the altitude. Referring to FIG. 12, optimal recording can be performed by controlling the write strength in relation to the altitude.

In FIG. 12, an area drawn by a circle indicates an area in which the modulation phenomenon illustrated in FIG. 4 occurs.

In FIGS. 10 through 12, diagonal dotted lines indicate an appropriate write strength in relation to the altitude.

Figure 13:
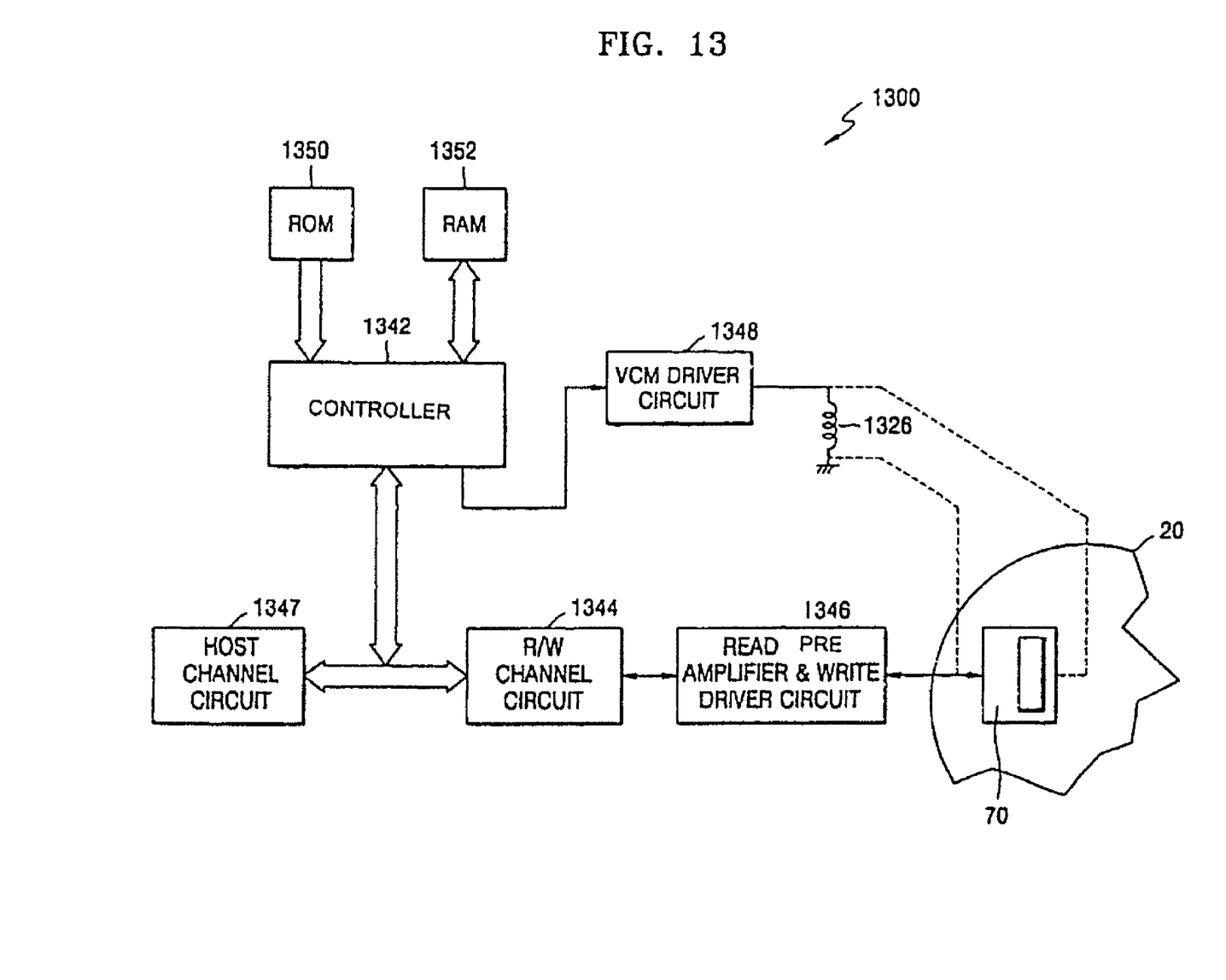
FIG. 13 is a block diagram illustrating an electrical circuit configuration of an HDD performing the write strength controlling method according to an embodiment of the present invention.

FIG. 13 is a block diagram illustrating an electrical circuit configuration of an HDD performing the write strength controlling method illustrated in FIG. 7 according to an embodiment of the present invention. Referring to FIG. 13, an apparatus 1300 includes a controller 1342 combined with the head 70 of FIG. 2 through a read/write (RAN) channel circuit 1344 and a pre-amplifier circuit 1346. The controller 1342 can be a digital signal processor (DSP), a microprocessor, or a microcontroller. The controller 1342 provides a control signal to the R/W channel circuit 1344 to read data from the disk 20 or write data on the disk 20. Information is typically transmitted from the R/W channel circuit 1344 to a host interface circuit 1347. The host interface circuit 1347 includes a buffer memory and a control circuit allowing the HDD 10 to interface with a system such as a personal computer.

The controller 1342 is combined with a voice coil motor (VCM) driver circuit 1348 supplying a driving current to a voice coil 1326. The controller 1342 supplies a control signal to the VCM driver circuit 1348 to control activation of a VCM and a motion of the head 70.

In a reproduction mode, the R/W channel circuit 1344 performs signal processing to convert an analog signal read from the head 70 and amplified by the pre-amplifier circuit 1346 to a digital signal which can be read by a host computer (not shown), output the converted digital signal through the host interface circuit 1347, receive user data from the host computer through the host interface circuit 1347, convert the user data to a write current to write the user data on the disk 20, and output the write current to the pre-amplifier circuit 1346.

The controller 1342 is connected to a nonvolatile memory 1350, such as a read only memory (ROM) or a flash memory, and a random access memory (RAM) 1352. The memory elements 1350 and 1352 store therein commands and data used by the controller 1342 to execute software routines.

The software routines include a seek routine for moving the head 70 from one track to another. The seek routine includes a servo control routine for guaranteeing that the head 70 is moved to an exact track.

The memory elements 1350 and 1352 store therein a program for performing the flying height measurement method and the write strength controlling method illustrated in FIGS. 5 through 7.

When the HDD 10 is in the burn-in test environment, the controller 1342 controls the head 70 to write uniform pattern data in an area for measuring the head flying height and to read the data in the area.

In addition, the controller 1342 writes uniform pattern data in an area for measuring the head flying height, reads the data in the area, calculates the average value AGC0 of the gain of the automatic gain control circuit, and writes the average value AGC0 in the maintenance area.

When power is applied to the HDD 10 in the user environment, the controller 1342 reads the data recorded in the measuring area and calculates the average value AGC of the gain of the automatic gain control circuit. The controller 1342 calculates a difference between the calculated average value AGC and the average reference value AGC0 recorded in the maintenance area. The controller 1342 determines whether the calculated difference dAGC exceeds the predetermined range X, and if the calculated difference dAGC exceeds the predetermined range X, the controller 1342 controls the write strength.

The present invention can be applied to various kinds of disk drives including HDDs and various kinds of data storage apparatuses.

As described above, using the write strength controlling method according to embodiments of the present invention, an optimized write strength can be obtained based on a head flying height.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling write strength of a hard disk drive (HDD), the method comprising:

calculating a flying height of a head before starting a recording operation; and controlling the write strength according to the calculated flying height, wherein the calculation of the flying height of the head comprises:

setting a reference value of an initial reproducing signal by measuring the magnitude of the initial reproducing signal read from a measuring area of a disk while rotating the disk at a regular rotation speed using constantly-maintained operating conditions of the HDD and measuring a reference flying height of the head corresponding to the reference value of the initial reproducing signal;

measuring the magnitude of a subsequent reproducing signal read from the measuring area of the disk while rotating the disk at the regular rotation speed; and calculating the flying height of the head by using the measured magnitude of the subsequent reproducing signal, the reference value of the initial reproducing signal, and the reference flying height corresponding to the reference value of the initial reproducing signal.

2. The method of claim 1, wherein the write strength is controlled by at least one of a write current, an overshoot current, or an overshoot duration.

3. The method of claim 1, wherein the measuring of the reference value of the initial reproducing signal and the reference flying height is performed using a burn-in test process.

4. The method of claim 1, wherein the measuring area is a servo area in which a servo signal is recorded on the disk.

5. The method of claim 1, wherein the measuring area is a data area in which data is recorded on the disk.

6. The method of claim 1, wherein the measuring area is protected so as not to be rewritten.

7. The method of claim 1, wherein the reference value of the initial reproducing signal and the measured magnitude of the subsequent reproducing signal are average values of a plurality of samples obtained from the measuring area.

8. A computer-readable recording medium having recorded thereon a computer-readable program comprising:

calculating a flying height of a head before starting a recording operation of a hard disk drive (HDD); and controlling write strength of the HDD according to the calculated flying height, wherein the calculation of the flying height of the head comprises:

setting a reference value of an initial reproducing signal by measuring a magnitude of the initial reproducing signal read from a measuring area of a disk while rotating the disk at a regular rotation speed using constantly-maintained operating conditions of the HDD and measuring a reference flying height of the head corresponding to the reference value of the initial reproducing signal;

measuring the magnitude of a subsequent reproducing signal read from the measuring area of the disk while rotating the disk at the regular rotation speed; and calculating the flying height of the head using the measured magnitude of the subsequent reproducing signal, the reference value of the initial reproducing signal, and the reference flying height corresponding to the reference value of the initial reproducing signal.

9. The method of claim 1, wherein the subsequent reproducing signal is read from the measuring area of the disk white rotating the disk at the regular rotation speed in a user environment under non-constant operating conditions.

10. The medium of claim 8, wherein the subsequent reproducing signal is read from the measuring area of the disk while rotating the disk at the regular rotation speed in a user environment under non-constant operating conditions.

11. A hard disk drive for controlling write strength, comprising:

a disk;

a head suspended over the disk;

a controller calculating a flying height of the head before starting a recording operation and controlling the write strength according to the flying height, wherein the controller sets a reference value of an initial reproducing signal by measuring a magnitude of the initial reproducing signal read from a measuring area of a disk while rotating the disk at a regular rotation speed using constantly-maintained operating conditions of the hard disk drive and measuring a reference flying height of the head corresponding to the reference value of the initial reproducing signal, the controller measures the magnitude of a subsequent reproducing signal read from the measuring area of the disk while rotating the disk at the regular rotation speed, and the controller calculates the flying height of the head using the measured magnitude of the subsequent reproducing signal, the reference value of the initial reproducing signal, and the reference flying height corresponding to the reference value of the initial reproducing signal.

12. The hard disk drive according to claim 11, wherein the write strength is controlled by at least one of a write current, an overshoot current, or an overshoot duration.

13. The hard disk drive according to claim 11, wherein the controller measures the reference value of the initial reproducing signal and the reference flying height during a burn-in test process.

14. The hard disk drive according to claim 11, wherein the measuring area is a servo area in which a servo signal is recorded on the disk.

15. The hard disk drive according to claim 11, wherein the measuring area is a data area in which data is recorded on the disk.

16. The hard disk drive according to claim 11, wherein the measuring area is protected so as not to be rewritten.

17. The hard disk drive according to claim 11, wherein the reference value of the initial reproducing signal and the measured magnitude of the subsequent reproducing signal are average values of a plurality of samples obtained from the measuring area.

18. The hard disk drive according to claim 11, wherein the subsequent reproducing signal is read from the measuring area of the disk while rotating the disk at the regular rotation speed in a user environment under non-constant operating conditions.

19. A method of controlling write strength of a hard disk drive, comprising:

calculating a first gain value, in a chamber in which constant atmospheric pressure and constant temperature are maintained, of a hard disk drive;

calculating a second gain value of the hard disk drive in a user environment; and determining whether to control the write strength of the hard disk drive based on a difference calculated between the second gain value and the first gain value, wherein the write strength is determined based on a reference flying height of the head under constantly-maintained operating conditions.

20. The method of controlling write strength according to claim 19, wherein the second gain value is calculated under non-constant operating conditions of the hard disk drive in a user environment and the write strength of the hard disk drive is controlled in the user environment.

21. The method of controlling write strength according to claim 20, further comprising:
   measuring the reference flying height of a head that is corresponding to the first gain value; and
   determining a user-environment flying height of the head corresponding to the second gain value, prior to calculating the difference between the second and first gain values.

22. The method of controlling write strength according to claim 20, wherein the first gain value is determined by measuring the magnitude of an initial reproducing signal read from a disk under constantly-maintained operating conditions and the second gain value is determined by measuring the magnitude of a subsequent reproducing signal in the user environment.

23. The method of controlling write strength according to claim 19, wherein if the calculated difference exceeds a pre-determined, specified range, the write strength is controlled.

24. The method of controlling write strength according to claim 19, wherein if the calculated difference does not exceed a pre-determined, specified range, the write strength is not controlled.

25. The method of controlling write strength according to claim 23, wherein if the calculated difference exceeds the specified range and has a positive value, the write strength is increased.

26. The method according to claim 23, wherein if the calculated difference exceeds the specified range and has a negative value, the write strength is decreased.

27. A hard disk drive for controlling write strength, comprising:
   a disk;
   a head suspended over the disk; and
   a controller calculating a first and a second gain value of the hard disk drive, the first gain value being calculated in a chamber in which constant atmospheric and constant temperature are maintained, the second gain value being calculated in a user environment, and determining whether to control the write strength of the hard disk drive based on a difference calculated between the second gain value and the first gain value,
   wherein a write strength is determined based on the reference flying height of the head under constantly-maintained operating conditions.

28. The hard disk drive according to claim 27, wherein the controller measures a reference flying height of the head corresponding to the first gain value and determines a flying height of the head corresponding to the second gain value, prior to calculating the difference between the second and first gain values.

* * * * *

UNITED STATES PATENT AND TRADEMARK OFFICE
CERTIFICATE OF CORRECTION

PATENT NO. : 7,660,059 B2 Page 1 of 1
APPLICATION NO. : 11/430030
DATED : February 9, 2010
INVENTOR(S) : Hyo-june Ahn et al.

It is certified that error appears in the above-identified patent and that said Letters Patent is hereby corrected as shown below:

Column 9, Line 65, change "white" to --while--.

Signed and Sealed this

Eleventh Day of May, 2010

David J. Kappos
*Director of the United States Patent and Trademark Office*